(12) United States Patent
Conrad

(10) Patent No.: US 6,457,205 B1
(45) Date of Patent: Oct. 1, 2002

(54) VACUUM CLEANER HAVING A PLURALITY OF POWER MODES

(75) Inventor: Wayne Ernest Conrad, Hampton (CA)

(73) Assignee: Fantom Technologies Inc., Welland (CA)

(*) Notice: Subject to any disclaimer, the term of this patent is extended or adjusted under 35 U.S.C. 154(b) by 0 days.

(21) Appl. No.: 09/576,249

(22) Filed: May 24, 2000

(51) Int. Cl.⁷ .................................................. A47L 9/28
(52) U.S. Cl. .......................... 15/319; 15/412; 15/DIG. 1
(58) Field of Search ..................... 15/319, 412, DIG. 1, 15/413

(56) References Cited

U.S. PATENT DOCUMENTS

| | | | |
|---|---|---|---|
| 4,398,316 A | * 8/1983 | Scott et al. ................ | 15/339 X |
| 4,811,450 A | 3/1989 | Steadings | |
| 4,969,229 A | 11/1990 | Svandberg et al. | |
| 5,047,597 A | * 9/1991 | Jailor ........................ | 15/319 X |
| 5,074,006 A | 12/1991 | Eremita | |
| 5,188,141 A | 2/1993 | Cook et al. | |
| 5,195,852 A | 3/1993 | Malugani et al. | |
| 5,276,939 A | * 1/1994 | Uenishi ........................ | 15/319 |
| 5,421,058 A | 6/1995 | Zahuranec et al. | |
| 5,746,583 A | 5/1998 | Spear | |
| 5,881,430 A | * 3/1999 | Driessen et al. ............... | 15/319 |
| 6,008,608 A | 12/1999 | Holsten et al. | |
| 6,105,202 A | * 8/2000 | Grasso et al. .................. | 15/319 |
| 6,131,236 A | * 10/2000 | Roth .............................. | 5/319 |

* cited by examiner

Primary Examiner—Chris K. Moore
(74) Attorney, Agent, or Firm—Bereskin & Parr; Philip C. Mendes da Costa (57) ABSTRACT

A vacuum cleaner has a plurality of operating modes is provided. The vacuum cleaner includes a power control system having at least one sensor for automatically sensing a change in the operating mode of the vacuum cleaner and for generating a mode signal. A microprocessor responsive to the mode signal is adapted to vary the power supply signal being supplied to the vacuum cleaner motor and fan assembly.

27 Claims, 5 Drawing Sheets

VACUUM CLEANER HAVING A PLURALITY OF POWER MODES

FIELD OF THE INVENTION

This invention relates to a vacuum cleaner having a plurality of power modes and more specifically to a power control system for such a cleaner.

BACKGROUND OF THE INVENTION

Historically, power control systems for vacuum cleaners have been designed to provide a uniform flow of power. In the case of vacuum cleaners with electrical motors, power delivery systems have been designed so as to ensure a continuous flow of electricity to the motor so that the drive shaft driven by the motor runs at a constant rate of revolution.

More recently, developments have been directed towards providing variable speed control for vacuum motors. U.S. Pat. No. 6,008,608, which issued to Holstein et al., discloses a switch and speed control assembly for an electronically controlled vacuum cleaner motor. Holstein et al. '608 provides a control member coupled to a voltage varying device that regulates the amount of power supplied to the vacuum cleaner motor control circuit. The control member includes a thumb wheel which is operated by the user to manually adjust the voltage varying device to selectively vary the speed of the vacuum cleaner motor. Holstein et al. '608 teaches that a spring may apply a counterforce to the control member to return the motor speed to a normal operating condition after momentarily engaging a "high on" mode. Thus, in Holstein et al. '608, the user must manually operate the control member.

In U.S. Pat. No. 4,969,229, which issued to Svanberg et al., a battery operated surface treatment apparatus having a booster function is disclosed in which a separate battery is connected in series with the batteries in the main power supply unit in order to temporarily boost the power. A knob is manually operated to activate the booster function. A timing control is optionally provided to limit the period of operation of the booster function in order to prevent overheating. Svanberg et al. '229 indicates at column 1, lines 27–31, that the invention is directed to vacuum cleaners not provided with any electronic speed control.

In U.S. Pat. No. 4,811,450, which issued to Steadings, a vacuum cleaner having an auxiliary cleaning means is disclosed. The auxiliary cleaning means of Steadings '450 includes a flanged portion which is used to divert the suction force in a main suction air channel into an auxiliary cleaning hose. According to Steadings '450, during auxiliary cleaning, an increased suction force may be created in the auxiliary hose by closing off the air flow in the main suction air channel, thereby relieving part of the load on the common suction motor. Steadings '450 explains that such relief results in increased rotational speed of the motor, which in turn correspondingly increases the suction air flow in the auxiliary hose. However, Steadings '450 makes it clear, at column 1, lines 54–60, that in the auxiliary mode, the increase in the operational speed of the suction motor is obtained without requiring any electronic motor control or regulation.

SUMMARY OF THE INVENTION

The present invention is directed to a vacuum cleaner having a plurality of power modes, and to a power control system which is capable of maintaining the cleaning performance of the vacuum cleaner in those various power modes and/or of controlling the power output to extend the operational life of a battery operated vacuum cleaner. Briefly, the power control system includes one or more sensors or switches which are used to sense the mode of operation of the vacuum cleaner. Signals from the one or more sensors or switches are then directed to a microprocessor which in turn varies a power supply signal being provided to the vacuum cleaner motor.

In accordance with an aspect of the present invention, there is provided a vacuum cleaner having a plurality of operating modes, comprising:
(i) at least one motor and fan assembly for receiving a power supply signal and producing a suction airflow during use of the vacuum cleaner;
(ii) at least one sensor for automatically sensing a change in the operating mode of said vacuum cleaner and generating a mode signal in response thereto; and
(iii) a microprocessor responsive to said mode signal and adapted to vary said power supply signal.

In a preferred embodiment, the vacuum cleaner has a plurality of distinct operating positions and at least one sensor is adapted to sense a change in the operating mode based on a change in the operating position of said vacuum cleaner.

In another embodiment, the vacuum cleaner comprises a cleaning head and a main casing pivotally connected to said cleaning head, and at least one sensor is adapted to sense when said main casing is positioned generally vertically above said cleaning head to sense that said vacuum cleaner is in standby operating mode.

In yet another embodiment, the vacuum cleaner comprises a cleaning head, a main casing pivotally connected to said cleaning head and an auxiliary hose, and at least one sensor is adapted to sense when said main casing is positioned generally vertically above said cleaning head and said vacuum cleaner is configured such that said auxiliary hose is in airflow communication with said motor and fan assembly and to generate a high flow mode signal in response thereto.

In another embodiment, the vacuum cleaner is an upright vacuum cleaner and further includes an auxiliary hose connectable in airflow communication with said motor and fan member assembly, and a high flow mode sensor for sensing when said auxiliary hose is in use.

More preferably, the vacuum cleaner includes a receptacle for releasably receiving said auxiliary cleaning hose, said high flow mode sensor being provided in said receptacle for sensing when said auxiliary cleaning hose is released from said receptacle.

In an alternative embodiment, the vacuum cleaner further comprises at least one power supply for generating said power supply signal. The power supply may comprise a rechargeable battery.

In an embodiment including a rechargeable battery, the vacuum cleaner preferably includes at least one sensor adapted to sense when said vacuum cleaner is in battery recharge mode and to generate a recharge mode signal in response thereto, said microprocessor being responsive to said recharge mode signal and being adapted to vary said power supply signal to operate said motor in a low flow mode, whereby airflow is produced to cool said battery during recharge.

In another aspect of the present invention, there is provided a vacuum cleaner having a plurality of operating modes, comprising:
(i) suction means for receiving a power supply signal and producing a suction airflow during use of the vacuum cleaner;

(ii) sensor means for sensing a change in the operating mode of said vacuum cleaner and generating a mode signal in response thereto; and (iii) processor means responsive to said mode signal and adapted to vary said power supply signal.

In a preferred embodiment, the vacuum cleaner has a plurality of distinct operating positions and the sensor means is adapted to sense a change in the operating mode based on a change in the operating position of said vacuum cleaner.

In another embodiment, the sensor means includes a standby mode sensor for sensing a standby mode and generating a standby mode signal in response thereto, said processor means being adapted to vary said power supply signal in response to said standby mode signal so that said suction means is operated at decreased power as compared to normal mode when said vacuum cleaner is used to clean a surface.

In yet another embodiment, the sensor means further includes a high flow mode sensor for sensing a high flow mode and generating a high flow mode signal in response thereto, said processor means being adapted to vary said power supply signal so that said suction means is operated at increased power as compared to the normal mode.

In an embodiment including a rechargeable battery, the vacuum cleaner preferably includes a battery recharge mode sensor for sensing a battery recharge mode and generating a battery recharge mode signal in response thereto, said processor means being adapted to vary said power supply signal to operate said suction means in a low flow mode, so that airflow is produced to cool said battery during recharge.

In yet another aspect of the present invention, there is provided a vacuum cleaner having a plurality of operating modes, comprising:

(i) at least one motor and fan assembly for receiving a power supply signal and producing a suction airflow during use of the vacuum cleaner, said vacuum cleaner having a plurality of distinct operating positions, each of said operating modes corresponding to one of said distinct positions;

(ii) at least one switch for generating a mode signal corresponding to at least one of the operating modes; and (iii) a microprocessor responsive to said mode signal and adapted to vary said power supply signal.

In one embodiment, the vacuum cleaner includes a standby mode switch for generating a standby mode signal when said vacuum cleaner is in a standby mode position, said processor means being adapted to vary said power supply signal in response to said standby mode signal so that said motor and fan assembly is operated at decreased power as compared to normal mode when said vacuum cleaner is used to clean a surface.

In another embodiment, the vacuum cleaner includes a high flow mode switch for generating a high flow mode signal when said vacuum cleaner is in a high flow mode position, said processor means being adapted to vary said power supply signal in response to said high flow mode signal so that said motor and fan assembly is operated at increased power as compared to normal mode when said vacuum cleaner is used to clean a surface.

In yet another embodiment, the vacuum cleaner includes a battery recharge mode switch for generating a battery recharge mode signal when said vacuum cleaner is in a battery recharge mode position, said processor means being adapted to vary said power supply signal to operate said motor and fan assembly in a low flow mode, so that airflow is produced to cool said battery during recharge.

BRIEF DESCRIPTION OF THE DRAWINGS

These and other advantages of the instant invention will be more fully and particularly understood in connection with the following description of the preferred embodiments of the invention in which.

DESCRIPTION OF THE PREFERRED EMBODIMENT

The teachings of the present invention are directed to improving the performance and efficiency of vacuum cleaners in general, and more specifically to maintaining the efficiency of the vacuum cleaner in various operating modes by means of a power control system.

By operating the vacuum cleaner in one of a plurality of possible operating modes, depending on the cleaning task, a degree of improved performance and efficiency will be achieved. As mentioned, possible operating modes may include a "normal" operating mode, a "high flow" mode for auxiliary cleaning, a "standby" mode for reduced speed during interruptions in vacuuming, and a "battery recharge" mode for battery operated vacuum cleaners.

Figure 1:
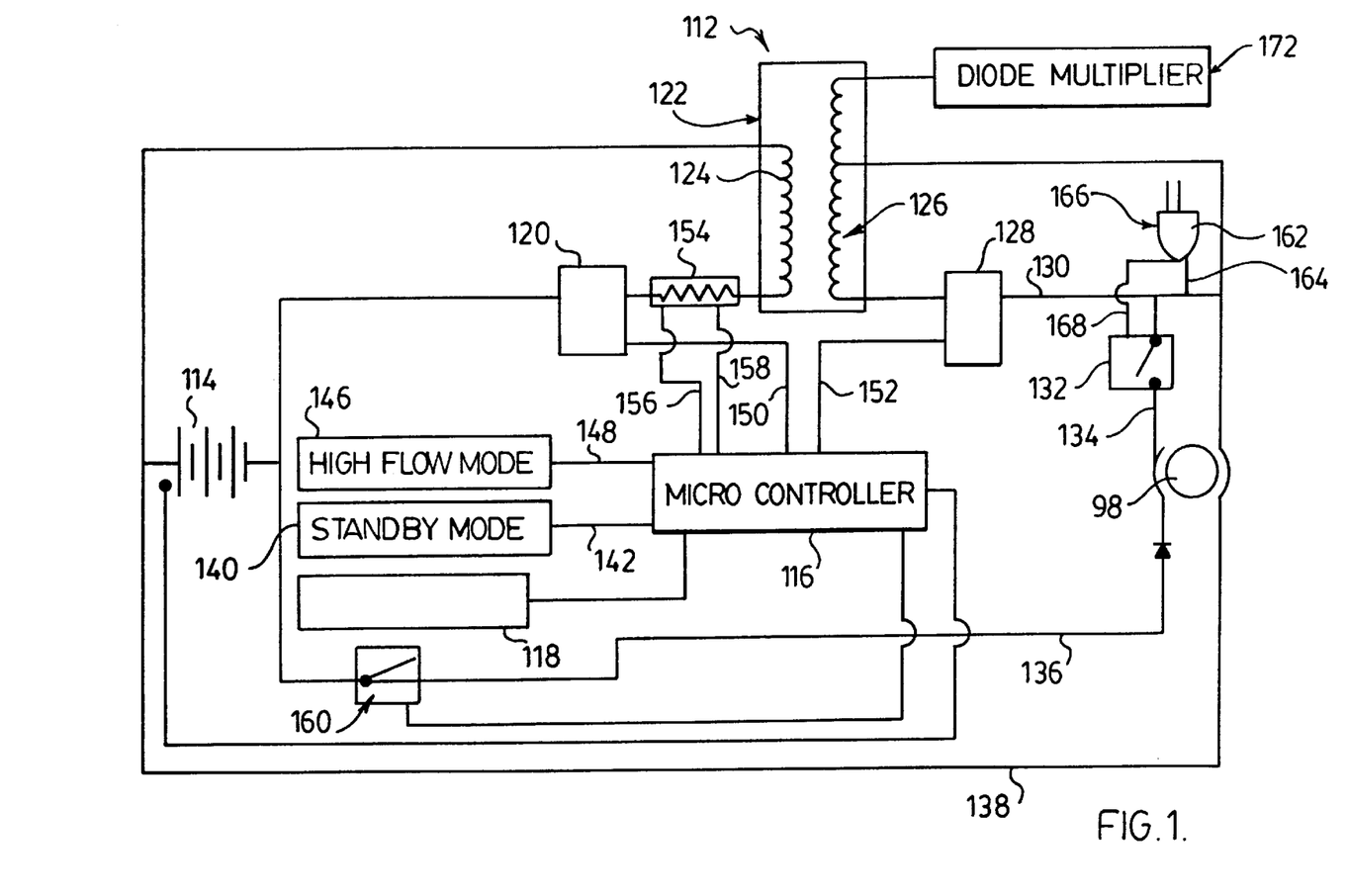
FIG. 1 is a schematic of a circuit which may be used in a power control system for a vacuum cleaner according to an embodiment of the present invention.
Figure 2:
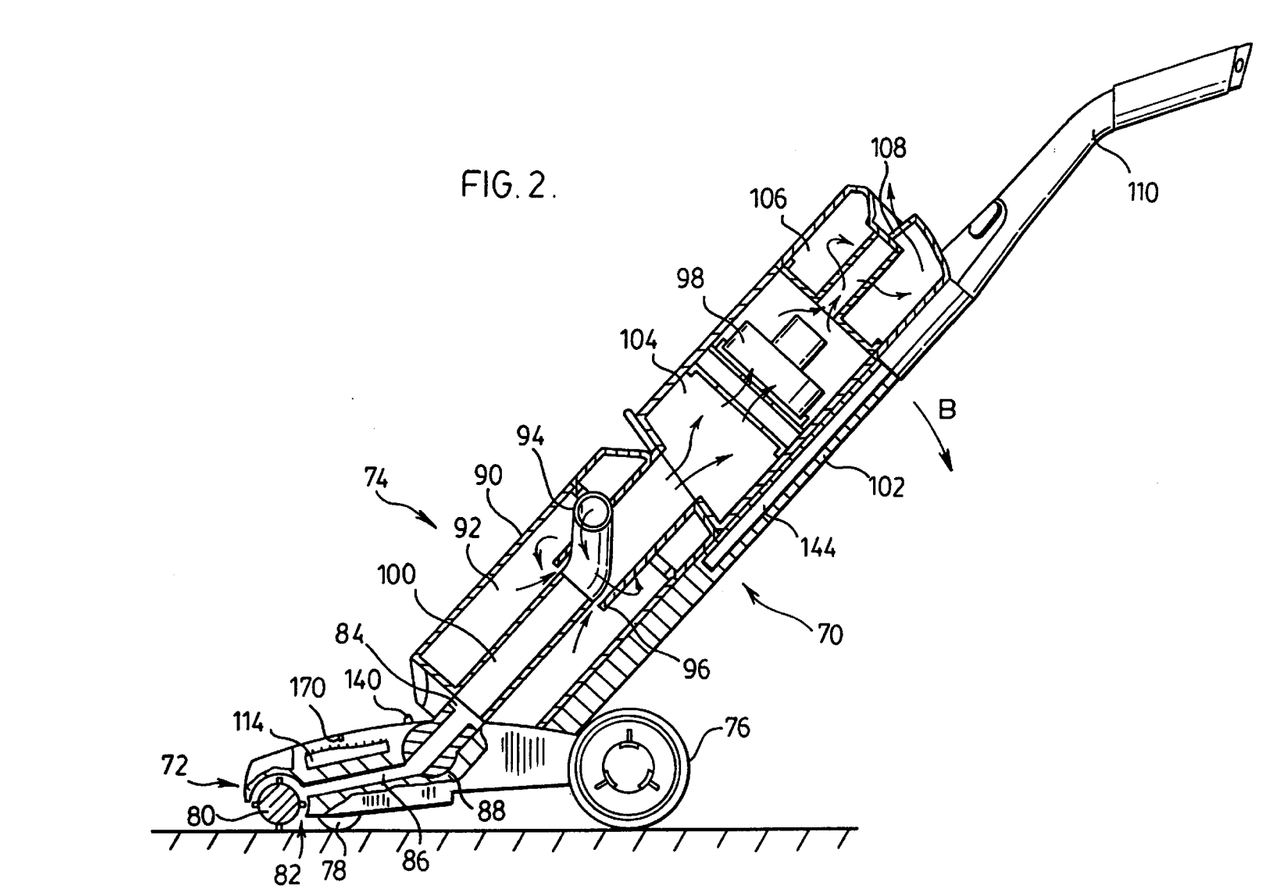
FIG. 2 is a cross-section of a vacuum cleaner including the circuit of FIG. 1, shown operating in normal mode.
Figure 3:
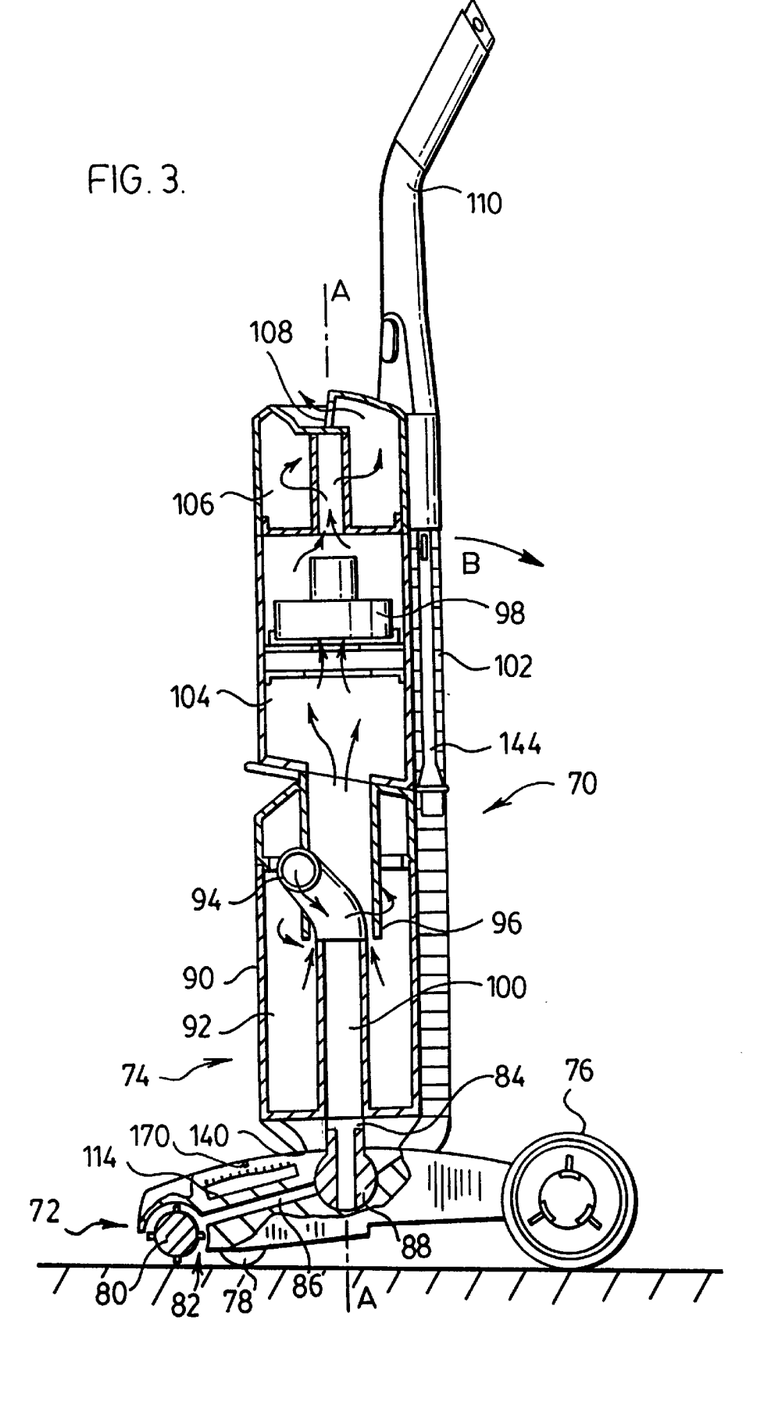
FIG. 3 is a cross-section of the vacuum cleaner of FIG. 2 shown operating in standby mode.
Figure 4:
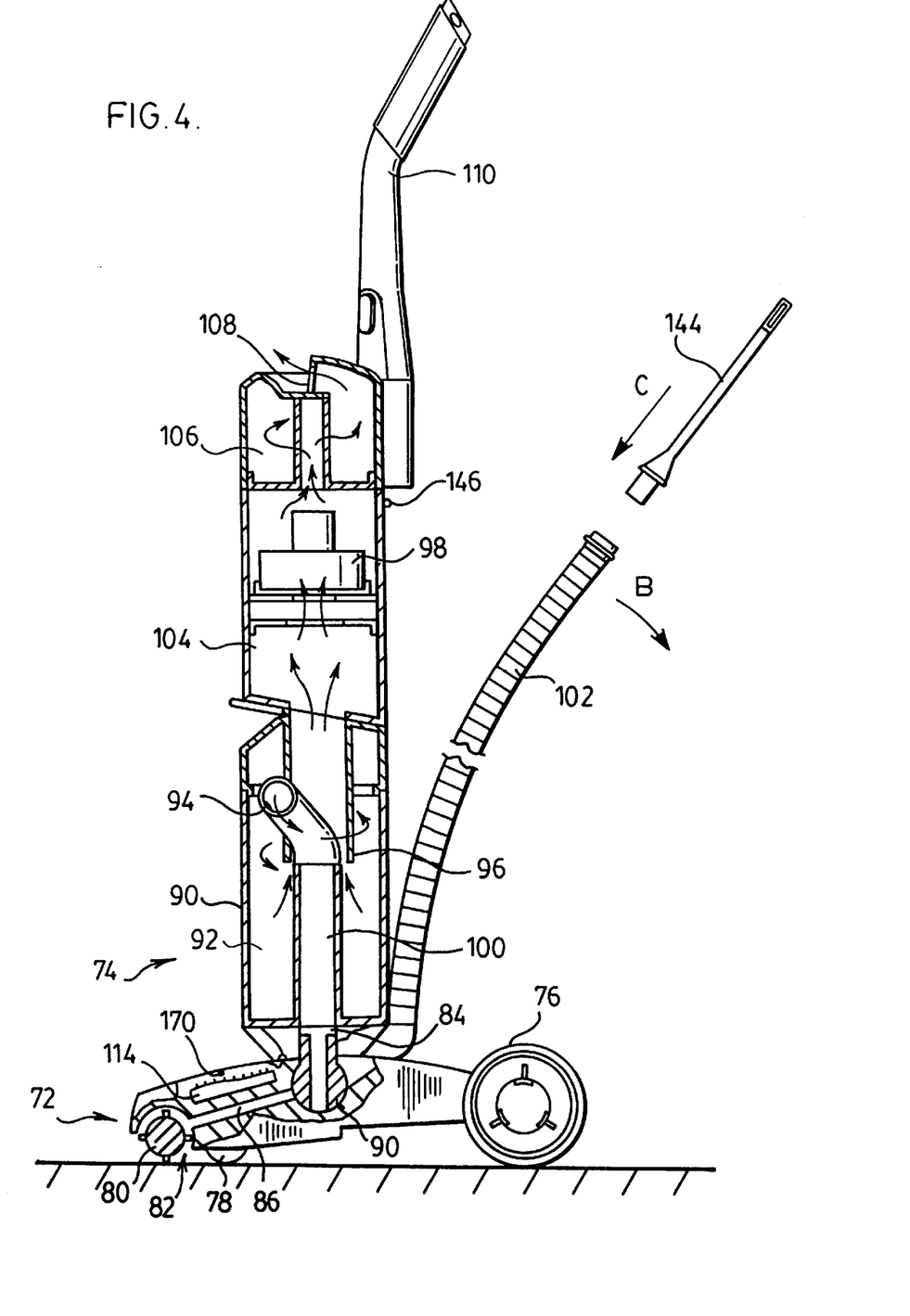
FIG. 4 is a cross-section of the vacuum cleaner of FIG. 2 operating in high flow mode with an auxiliary cleaning hose detached from the main casing.

Referring to FIG. 1, a motor control circuit is shown which may be used in a vacuum cleaner in accordance with the instant invention. FIGS. 2, 3 and 4 exemplify a vacuum cleaner which may include the circuit of FIG. 1. It will be appreciated that the vacuum cleaner may be of any construction known in the art. As shown in FIG. 2, a vacuum cleaner 70 has vacuum cleaner head 72 and main casing 74. FIG. 2 shows the vacuum cleaner 70 operating in the normal floor cleaning mode referred to earlier (i.e. cleaning head 72 is being used to clean the surface over which cleaner head 72 travels). Cleaning head 72 has rear wheels 76 and front wheels 78 to enable movement of cleaning head 72 across a surface. Cleaning head 72 is provided with a rotatably mounted brush 80 which is positioned above air inlet 82. Cleaning head 72 has an air outlet 84 positioned at the end of air flow path 86.

Main casing 74 contains the filtration means which preferably comprises cyclone housing 90 defining cyclone chamber 92. Cyclone chamber 92 is provided with an air inlet 94 which is in air flow communication with air outlet 84 by means of air flow path 100.

Motor 98 is positioned above and downstream from air outlet 96. Outlet 108 from vacuum cleaner 70 is provided downstream from motor 98. Additional filtration means may be provided, if desired, in one or both of chambers 104 and 106. Handle 110 is provided so as to enable the vacuum cleaner to be pushed by a user.

Now referring to FIG. 3, the vacuum cleaner 70 of FIG. 2 is shown in the standby mode referred to earlier. Rotatable valve 88 is provided in the cleaning head 72 so as to isolate the filtration means in main casing 74 from air flow path 86 when the vacuum cleaner 70 is in the upright position (i.e. the main casing 74 is positioned generally vertically over the cleaning head 72).

A first microswitch 140 senses when the vacuum cleaner 70 is in the upright position and sends a signal to a microcontroller 116 (FIG. 1) to vary the power signal to cause the motor to operate on standby, as will be explained further below. It will be appreciated that air flow paths 86 and 100 need not be isolated to utilize the standby mode.

Now referring to FIG. 4, as shown, vacuum cleaner 70 may also be adapted for above floor cleaning by means of an auxiliary cleaning hose 102 which is releasably connectable to main casing 74 by any means known in the art. A second microswitch 146 detects that the hose 102 has been removed from its receptacle and sends a signal to the microcontroller 116 to cause the motor to operate in the high flow mode referred to earlier, and as described further below. In the embodiment of the vacuum cleaner 70 shown in FIG. 4, it is preferable that the vacuum cleaner 70 first be put into the standby mode as shown in FIG. 3 so that all of the air travels through hose 102. Consequently, a vacuum cleaner 70 may go through an intermediate standby mode when switching between the normal mode and the high flow mode described above. However, it will be appreciated that this need not be the case in another vacuum cleaner configuration. In fact, it will be appreciated by those skilled in the art that the motor control circuit of the instant application may be utilized with virtually any vacuum cleaner, such as with a vacuum cleaner using any filtration means known in the art, as well as any type of vacuum cleaner, e.g. upright, canister, back-pack and central vacuum systems.

According to one aspect of the instant invention, the motor control circuit may be utilized with a vacuum cleaner which is to be plugged into a standard electrical outlet in a house. In such a case, the power control system may be designed to provide full power in the high flow mode and to reduce the current provided to the motor in the normal mode. Alternately, the power control system may also be used with a vacuum cleaner which is powered by batteries and preferably rechargeable batteries. In such a case, the power control system may be designed to provide a standard level of power in the normal mode and to increase the power drawn from the batteries during the high flow mode. Preferably, in such a case, the power control system also controls the charging and discharging the batteries.

Referring back to FIG. 1, power control circuit 112 comprises a motor controller as well as a battery charger. Battery 114 supplies 50% of the power for motor 98 as DC current. The other half of the power is supplied to the motor through an inverter (namely field effect transistor 120 and transformer 122). This has the advantage that half the power is transmitted as DC (which has nominal circuit losses) and half is transmitted through the inverter (which may have an efficiency of eg. about 85%) for an overall efficiency of about 92.5%. It is recognized that by increasing the power channelled through the inverter, the flow rate of the mechanical system can be controlled. However, increasing the power channelled through the inverter increases the heat losses through the circuit and mitigates a portion of the energy saving realized in the fluid mechanical portion of the system. It will be appreciated the battery 114 may supply all of the power to motor 98 through the inverter circuit resulting in about a 7.5% reduction in the power savings. The instant design also advantageously allows multiple power levels to be supplied to motor 98.

Still referring to FIG. 1, the vacuum cleaner is operated by a user turning the vacuum cleaner on by an on/off switch 118, which may be any switch known in the art. When vacuum cleaner 70 is turned on, microcontroller 116 receives a signal from switch 118 and in turn starts to oscillate field effect transistor 120 at a high frequency (e.g. about 60 KHz). Circuit 112 is provided with transformer 122 having primary and secondary coils 124 and 126. The high frequency oscillation produced by field effect transistor 120 causes primary coils 124 to induce a high voltage in secondary coils 126. The high voltage induced in second coil 126 is switched on and off by field effect transistor 128 at a much lower frequency (e.g. 9 Hz) as controlled by microcontroller 116 by means of wire 152 to create a pulse train signal. The high voltage induced in second coil 126 may also be supplied to diode multiplier 172 to provide current to, eg. an electrostatic generator in vacuum cleaner 70.

Field effect transistor 128 is connected to motor 98 via wire 130, switch 132 and wire 134. Accordingly, the pulse train developed by field effect transistor 128 is supplied to motor 98 so as to cause sub-rotational accelerations as described herein whereby the efficiency of the power transfer from motor 98 to the fluid stream passing through vacuum cleaner 70 is improved.

In a cyclonic vacuum cleaner, the impulses are preferably $1/81$ seconds long having a voltage (amplitude) six times greater than the DC voltage supplied by battery 114 to motor 98 by means of wires 136, 138. The frequency of the pulses produced by field effect transition 128 is preferably 6–20 Hz for a cyclonic vacuum cleaner using a series universal motor wound to produce the desired flow rate when 50 volts AC is applied with 200 watts available. It will be appreciated that the pulse which is provided to motor 98 may be varied by changing the frequency of field effect transistor 128.

Still referring to FIG. 1, in accordance with another aspect of this invention, circuit 112 may include a first microswitch 140 which is activated when vacuum cleaner 70 is placed in the upright standby position shown in FIG. 3. Microswitch 140 may be of any known in the art which will provide a signal to microcontroller 116 when upper casing 74 is in the upright position shown in FIG. 3. In the embodiment shown in FIG. 3, the upright position is sensed due to engagement between upper casing 74 and microswitch 140. Alternatively, the sensor may be mounted on upper casing 74 to engage the vacuum cleaner head 72 and sense when upper casing 74 is in the upright position or the sensor may sense when upper casing 74 extends generally vertically. It will be understood that the sensor may be provided at any other location where it can sense the upright position (e.g. the sensor may be provided at the pivot point between the vacuum cleaner head 72 and the upper casing 74).

As explained earlier, first microswitch 140 causes a signal to be sent to microcontroller 116 by means of wire 142. This causes microcontroller 116 to terminate the oscillation of field effect transistors 120 and 128 thereby reducing the power consumption and air flow through motor and fan blade assembly 98.

Typically, a user may leave a vacuum cleaner running when in the upright position when attending to other tasks associated with vacuuming such as to move furniture or other objects which may be in the way. When first microswitch 140 is actuated, moving the vacuum cleaner into a standby mode, the power consumed by motor and fan blade assembly 98 is reduced thereby permitting a user to move furniture, answer the telephone or the like while reducing the power consumption of motor and fan blade assembly 98. Microswitch 140 may be utilized to switch a vacuum cleaner operating from a standard electrical outlet to a standby mode. This may be advantageous to decrease the noise produced by vacuum cleaner 70 when it is not being used. However, use of the standby mode is particularly advantageous in a battery powered vacuum cleaner in order to conserve the battery.

Now referring to FIG. 4, optionally, hose 102 is detachable from main casing 74, e.g., in the direction of arrow B so as to enable above the floor cleaning. Hose 102 may have a crevice cleaning tool or other attachment 144 slidably received therein in the direction of arrow C. In such a case, circuit 112 preferably also includes a second microswitch 146 for switching motor and fan blade assembly 98 to a high flow mode. The higher flow is desirable for enhanced cleaning using the accessory tools 144. Alternately, as the use of a length of hose causes additional pressure losses, increasing the power provided to motor and fan blade assembly 98 may result in the same flow rate through the filtration means when hose 102 is used. Microswitch 146 may be provided in the receptacle in which hose 102 is received and actuated when hose 102 is released from the receptacle (in the direction of arrow B). Microswitch 146 may be a pressure actuated switch (i.e. the switch may have a button which is pressed inwardly) or may be a proximity switch which senses the presence of hose 102 in its receptacle. When hose 102 is released, the button extends outwardly thereby sending a signal to microcontroller 116 by means of wire 148. In response to this signal, microcontroller 116 sends a signal to field effect transistors 120 and 128 by means of wires 150 and 152 respectively. This causes field effect transistor 120 to oscillate at a high frequency (e.g. 60 KHz or greater) and cause field effect transistor 128 to oscillate at a higher frequency than before (e.g. 11–15 Hz) with pulses of, e.g. $\frac{1}{81}$ to $\frac{1}{60}$ of a second for a typical cyclonic vacuum cleaner as described above. The longer pulse width and/or greater frequency of pulses delivered to motor and fan blade assembly 98 produces a higher flow of air through vacuum cleaner 70 then when the vacuum cleaner is drawing dirt laden air through inlet 82.

Microcontroller 116 also preferably includes a circuit for determining a level of charge remaining in battery 114. To this end, microcontroller 116 sends a signal to field effect transistor 120 which causes field effect transistor to switch on for a short period (e.g. approximately 0.1–0.2 seconds). This produces an impulse equivalent to DC. As the frequency of this impulse is very low, transformer 122 effectively becomes a low resistance short circuit across battery 114 thereby causing a current surge through low value resistor 154 which is series with transformer 122.

The voltage drop across low value resistor 154 caused by the current surge is conducted to (e.g.) the analog to digital port of microcontroller 116 by means of wires 156 and 158. While the voltage which is supplied by battery 114 may be relatively constant over a substantial portion of the operating life of a battery (e.g. 75% or more), it has surprisingly been determined that the rate of rise of current in response to a momentary short circuit does not remain constant. In particular, as the capacity of the battery is reduced (i.e. charge is withdrawn from the battery), the ability of battery 114 to supply a current surge is also reduced. Therefore, it is possible to determine the capacity remaining in the battery by occasionally producing a short circuit across battery 114 and monitoring the rate of rise of the current in response to the short circuit. For a NiMH sub C battery pack comprising two sets of twelve sintered cells connected in parallel, the di/dt varies from 300 A/S to 120 A/S from 90% capacity to 20% capacity while the voltage output is essentially constant. Thus, by knowing the di/dt relationship for a battery over the capacity for a battery, microcontroller 116 may provide a signal indicating the amount of capacity remaining in the battery or, if the battery is being charged, the degree to which the battery has been charged.

The same method may be utilized during the recharging of the battery to determine the charge state of the battery. Typically, the charge state of the battery is determined using the $-\Delta V$. When a battery is in the $-\Delta V$ range, it is already overcharged. Rechargeable batteries are subject to degradation if their temperature increases too much, which occurs when they are overcharged. Therefore, it is advantageous to determine the charged state of a battery prior to the battery becoming overcharged. Accordingly, during the recharging of a battery, microcontroller 116 may cause field effect transformer 120 to occasionally emit a low frequency pulse thereby producing a current surge which may be measured by the voltage drop across low value resistor 154.

Preferably, microcontroller 116 includes means for opening the circuit to thereby shut off motor and fan blade assembly 98 when battery 114 is at a sufficiently low charge level. Accordingly, circuit 112 may shut down the power drawn from battery 114 by opening relay 160 which opens the circuit to motor and fan blade assembly 98 and by terminating the signals which are send to field effect transistors 120 and 128.

It will be appreciated that battery 114 may be charged by removing battery 114 from vacuum cleaner 70 and placing it in a suitable charging unit. Preferably, battery 114 is charged in situ. To this end, vacuum cleaner 70 may include a plug 162 which is suitable for being received in a standard electrical outlet. Plug 162 is connected to circuit 112 by means of cord 164. When plug 162 is withdrawn from receptacle 166 (which may be provided at any desired position in vacuum cleaner 70), mechanical lever 168 trips switch 132 so as to disconnect motor and fan blade assembly 98 from the current. In this way, motor and fan blade assembly 98 (FIG. 2) will still receive current from wires 136 and 138 thereby causing motor and fan blade assembly 98 to operate at low power during the recharging operation.

When plug 162 is removed from receptacle 166, a signal is sent to microcontroller 116 such that when plug 162 is plugged into a standard power outlet, field effect transistor 128 is operated at, e.g. 60 KHz by microcontroller 116 while field effect transistor 120 provides low frequency pulses (eg. 10 Hz) to charge battery 114. The frequency of operation of field effect transistor 128 can be raised or lowered to vary the output voltage used to charge battery 114.

As will be appreciated, the operation of the motor and fan blade assembly 98 at low voltage DC during the recharging operation causes motor and fan blade assembly 98 to operate at a low speed so that air may be drawn across battery 114 and over, e.g., heat sink 170 which is thermally connected to battery 114 so as to cool battery 114 while it is being charged.

Figure 5:
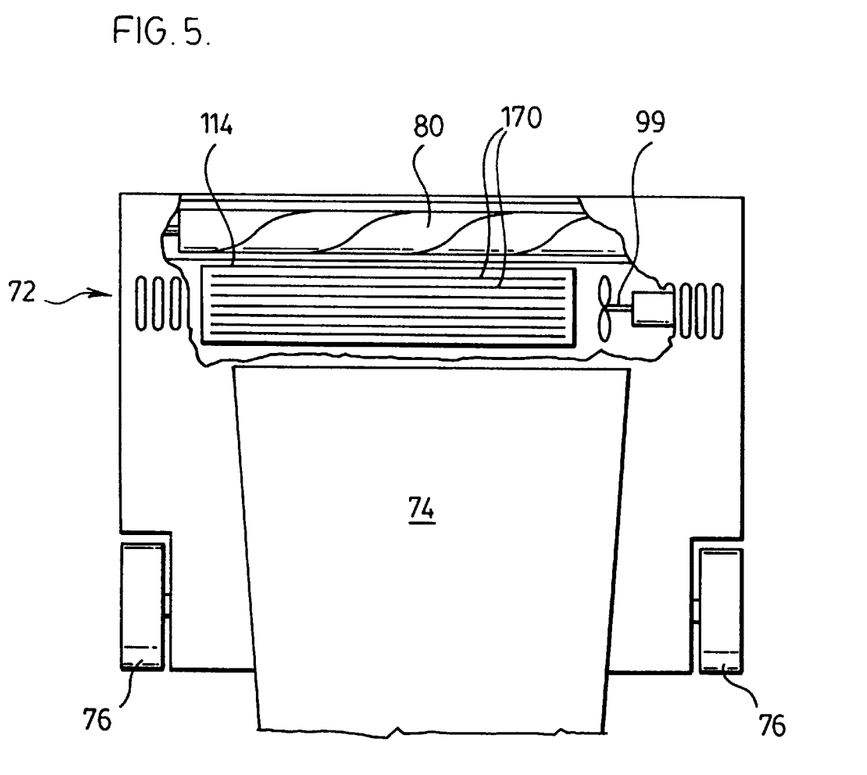
FIG. 5 is a partial break away top plan view of the vacuum cleaning head of FIG. 2 including a battery and a separate cooling motor and fan assembly.

Optionally, a switch 132 may be arranged to disconnect wire 136 from motor and fan blade assembly 98 so that motor and fan blade assembly 98 will not operate during the charging mode. Rather, referring to FIG. 5, a separate cooling motor and fan assembly 99 may be provided in air flow communication near battery 114 to reduce the sensible temperature of battery 114 during charging.

As stated above, possible operating modes may include a "normal" operating mode, a "high flow" mode for auxiliary cleaning, a "standby" mode for reduced speed during interruptions in vacuuming and a "battery recharge" mode. A vacuum cleaner according to the present invention may utilize any two of these operational modes in which case one switch is included for sending a signal to change between the modes. Preferably, the vacuum cleaner may be switched between any three of these modes (in which case the vacuum cleaner includes two switches) and, most preferably, the vacuum cleaner may be switched between all four modes (in which case it has three switches). It will be appreciated that the recharge mode is only applicable on battery operated vacuum cleaners.

The vacuum cleaner may use any switch or switches known in the art (e.g. mechanical or electrical; manual or automatic) and different operating modes may be actuated by different switches. Preferably the switches are constructed to automatically switch the current provided a motor when a user reconfigures the vacuum cleaner between, e.g., carpet cleaning and above the floor cleaning, when the vacuum cleaner is placed in the standby position or when a battery operated vacuum cleaner is recharged. However, switches which are manually operated by the user may be used to activate the various operating modes when the user reconfigures the vacuum cleaner.

It will be appreciated that the circuit of FIG. 1 is exemplary and that any power control circuit may be used to adjust the current provided to the motor.

I claim:

1. A vacuum cleaner having a plurality of operating modes and a plurality of distinct operating positions, comprising:
   (a) at least one motor and fan assembly for receiving a power supply signal and producing a suction airflow during use of the vacuum cleaner; at least one sensor adapted to sense a change in the operating mode based on a change in the operating position of said vacuum cleaner and generating a mode signal in response thereto; and
   (b) a controller responsive to said mode signal and adapted to vary said power supply signal.

2. The vacuum cleaner recited in claim 1, wherein said vacuum cleaner comprises a cleaning head and a main casing pivotally connected to said cleaning head, said at least one sensor being adapted to sense when said main casing is positioned generally vertically above said cleaning head to sense that said vacuum cleaner is in standby operating mode.

3. The vacuum cleaner recited in claim 2, further comprising an auxiliary hose and a high flow mode sensor for sensing when said main casing is positioned generally vertically above said cleaning head and said auxiliary hose is in airflow communication with said motor and fan assembly, and generating a high flow mode signal in response thereto.

4. The vacuum cleaner recited in claim 3, further comprising at least one power supply for generating said power supply signal.

5. The vacuum cleaner recited in claim 4, wherein said at least one power supply comprises a rechargeable battery.

6. The vacuum cleaner recited in claim 5, wherein said at least one sensor is adapted to sense when said vacuum cleaner is in battery recharge mode and to generate a recharge mode signal in response thereto, said controller being responsive to said recharge mode signal to vary said power supply signal to operate said motor in a low flow mode, whereby airflow is produced to cool said battery during recharge.

7. The vacuum cleaner recited in claim 1, wherein said vacuum cleaner comprises a cleaning head, a main casing pivotally connected to said cleaning head and an auxiliary hose, said at least one sensor being adapted to sense when said main casing is positioned generally vertically above said cleaning head and said vacuum cleaner is configured such that said auxiliary hose is in airflow communication with said motor and fan assembly, and to generate a high flow mode signal in response thereto.

8. The vacuum cleaner recited in claim 1, wherein said vacuum cleaner is an upright vacuum cleaner, said upright vacuum cleaner further including an auxiliary hose connectable in airflow communication with said motor and fan member assembly, and a high flow mode sensor for sensing when said auxiliary hose is in use.

9. The vacuum cleaner recited in claim 8, further including a receptacle for releasably receiving said auxiliary cleaning hose, said high flow mode sensor being provided proximate said receptacle for sensing when said auxiliary cleaning hose is released from said receptacle.

10. The vacuum cleaner recited in claim 1, further comprising at least one power supply for generating said power supply signal.

11. The vacuum cleaner recited in claim 10, wherein said at least one power supply comprises a rechargeable battery.

12. The vacuum cleaner recited in claim 11, wherein said at least one sensor is adapted to sense when said vacuum cleaner is in battery recharge mode and to generate a recharge mode signal in response thereto, said controller being responsive to said recharge mode signal to vary said power supply signal to operate said motor in a low flow mode, whereby airflow is produced to cool said battery during recharge.

13. The vacuum cleaner recited in claim 11, further comprising an auxiliary motor and fan assembly, said auxiliary motor and fan assembly being located proximate to said battery and being connectable to a power source, said at least one sensor being adapted to sense when said vacuum cleaner is in battery recharge mode and being adapted to turn on said auxiliary motor and fan assembly so as to cool said battery during recharge.

14. A vacuum cleaner having a plurality of operating modes and a plurality of distinct operating positions, comprising:
   (i) suction means for receiving a power supply signal and producing a suction airflow during use of the vacuum cleaner;
   (ii) sensor means for sensing a change in the operating mode of said vacuum cleaner based on a change in the operating position of said vacuum cleaner and generating a mode signal, in response thereto; and
   (iii) processor means responsive to said mode signal and adapted to vary said power supply signal.

15. The vacuum cleaner recited in claim 14, wherein said sensor means includes a standby mode sensor for sensing a standby mode and generating a standby mode signal in response thereto, said processor means being adapted to vary said power supply signal in response to said standby mode signal so that said suction means is operated at decreased power as compared to normal mode when said vacuum cleaner is used to clean a surface.

16. The vacuum cleaner recited in claim 15, wherein said sensor means further includes a high flow mode sensor for sensing a high flow mode and generating a high flow mode signal in response thereto, said processor means being adapted to vary said power supply signal so that said suction means is operated at increased power as compared to the normal mode.

17. The vacuum cleaner recited in claim 16, further comprising power supply means for generating said power supply signal, said power supply means comprising a rechargeable battery.

18. The vacuum cleaner recited in claim 17, wherein said sensor means further includes a battery recharge mode sensor for sensing a battery recharge mode and generating a battery recharge mode signal in response thereto, said processor means being adapted to vary said power supply signal to operate said suction means in a low flow mode, so that airflow is produced to cool said battery during recharge.

19. The vacuum cleaner recited in claim 15, further comprising power supply means for generating said power supply signal, said power supply means comprising a rechargeable battery.

20. The vacuum cleaner recited in claim 19, wherein said sensor means further includes a battery recharge mode sensor for sensing a battery recharge mode and generating a battery recharge mode signal in response thereto, said processor means being adapted to vary said power supply signal to operate said suction means in a low flow mode, so that airflow is produced to cool said battery during recharge.

21. The vacuum cleaner recited in claim 14, wherein said vacuum cleaner comprises an upright vacuum cleaner having a cleaning head and an upper casing mounted thereon, said vacuum cleaner operating in a normal mode when said cleaning head is used to clean a surface, and said sensor means includes a high flow mode sensor for sensing a high flow mode when an auxiliary hose is in use and generating a high flow mode signal in response thereto, said processor means being adapted to vary said power supply signal so that said suction means is operated at increased power as compared to the normal mode.

22. The vacuum cleaner recited in claim 21, further comprising a rechargeable battery, and said sensor means further includes a battery recharge mode sensor for sensing and a battery recharge mode and generating a battery recharge mode signal in response thereto, said processor means being adapted to vary said power supply signal to operate said suction means in a low flow mode, so that airflow is produced to cool said battery during recharge.

23. The vacuum cleaner recited in claim 14, further comprising a rechargeable battery, and wherein said sensor means includes a battery recharge mode sensor for sensing a battery recharge mode and generating a battery recharge mode signal in response thereto, said processor means being adapted to vary said power supply signal to operate said suction means in a low flow mode, so that airflow is produced to cool said battery during recharge.

24. A vacuum cleaner having a plurality of operating modes, comprising:
  (i) at least one motor and fan assembly for receiving a power supply signal and producing a suction airflow during use of the vacuum cleaner, said vacuum cleaner having a plurality of distinct operating positions, each of said operating modes corresponding to one of said distinct positions;
  (ii) at least one switch for generating a mode signal corresponding to at least one of the operating modes; and
  (iii) a microprocessor responsive to said mode signal and adapted to vary said power supply signal.

25. The vacuum cleaner recited in claim 24, wherein said at least one switch is a standby mode switch for generating a standby mode signal when said vacuum cleaner is in a standby mode position, said processor means being adapted to vary said power supply signal in response to said standby mode signal so that said motor and fan assembly is operated at decreased power as compared to normal mode when said vacuum cleaner is used to clean a surface.

26. The vacuum cleaner recited in claim 24, wherein said at least one switch is a high flow mode switch for generating a high flow mode signal when said vacuum cleaner is in a high flow mode position, said processor means being adapted to vary said power supply signal in response to said high flow mode signal so that said motor and fan assembly is operated at increased power as compared to normal mode when said vacuum cleaner is used to clean a surface.

27. The vacuum cleaner recited in claim 24, further comprising a rechargeable battery, and wherein said at least one switch is a battery recharge mode switch for generating a battery recharge mode signal when said vacuum cleaner is in a battery recharge mode position, said processor means being adapted to vary said power supply signal to operate said motor and fan assembly in a low flow mode, so that airflow is produced to cool said battery during recharge.

* * * * *